Nov. 24, 1931.  F. C. McMANUS  1,833,053
SIX-WHEEL CHASSIS WITH INDIVIDUAL WHEEL MOUNTING
Filed May 18, 1929  2 Sheets-Sheet 1
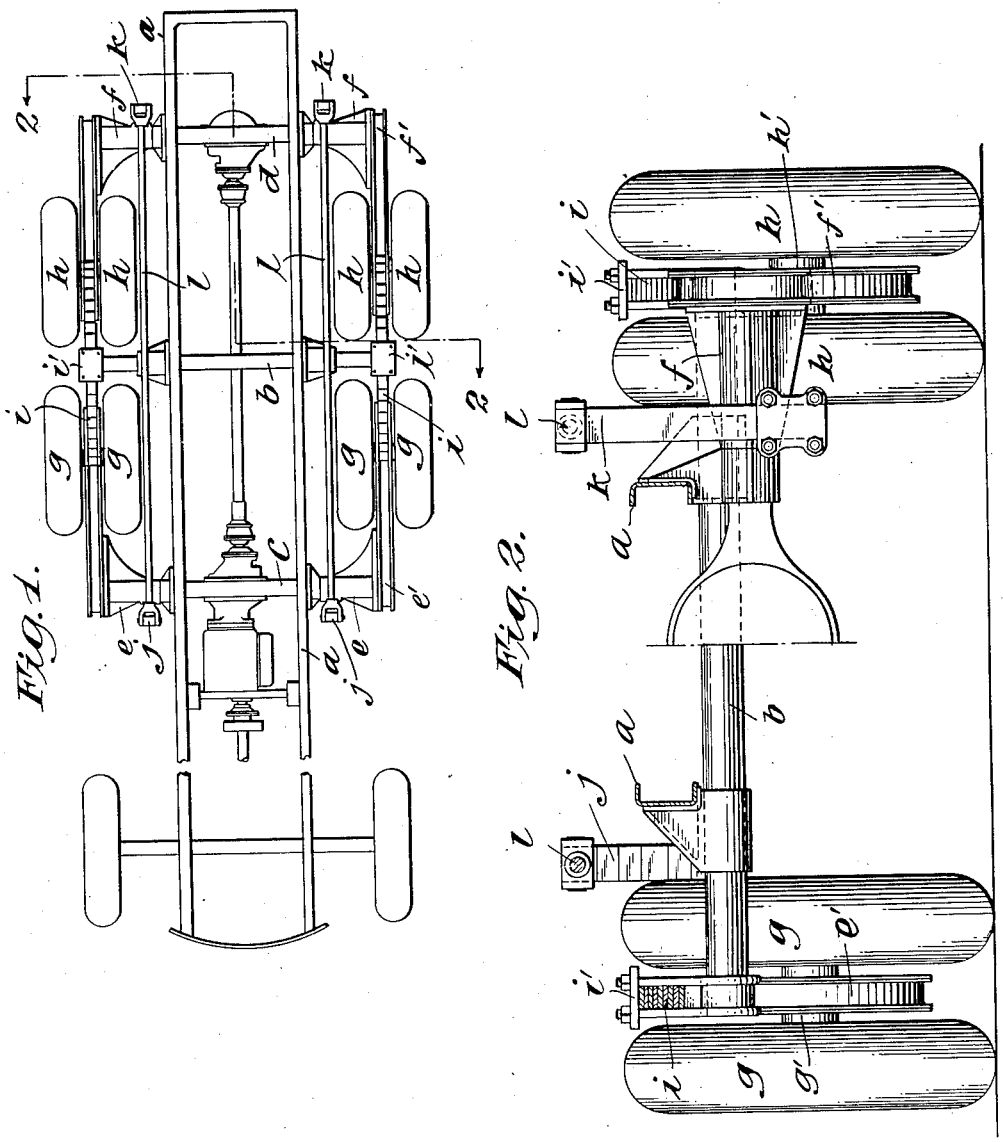
Inventor:
Frank C. McManus
By his Attorneys
Redding, Greeley, O'Shea & Campbell Nov. 24, 1931.    F. C. McMANUS    1,833,053
SIX-WHEEL CHASSIS WITH INDIVIDUAL WHEEL MOUNTING
Filed May 18, 1929    2 Sheets-Sheet 2
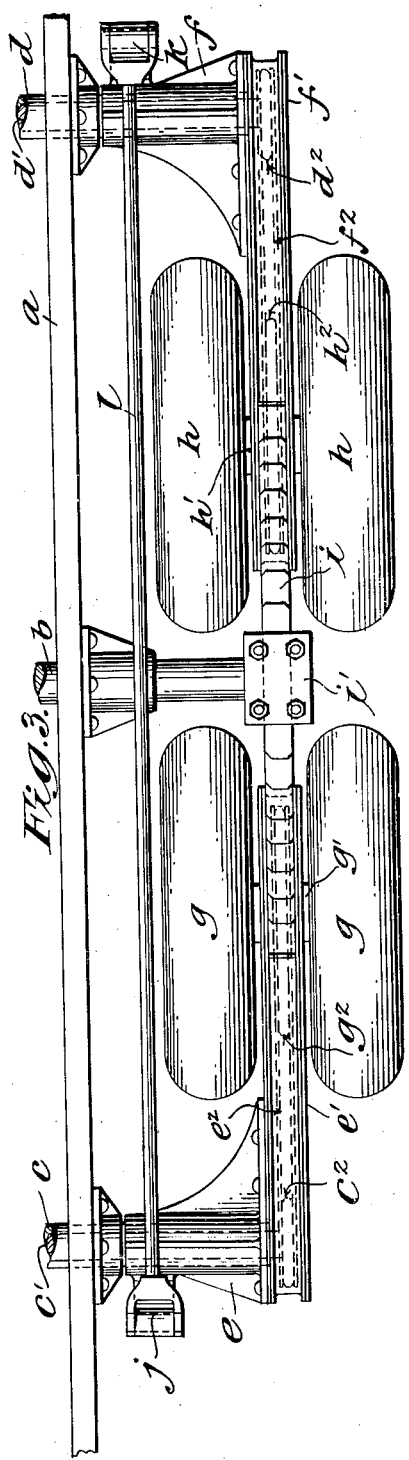
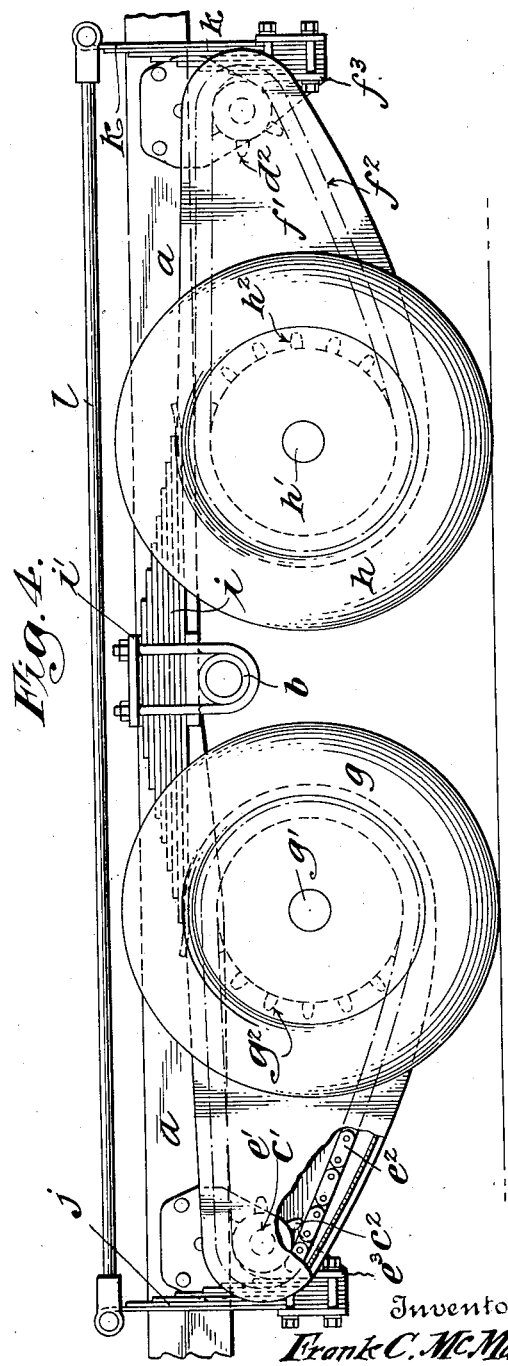
Inventor:
Frank C. McManus
By his Attorneys
Redding, Greeley, O'Shea & Campbell Patented Nov. 24, 1931

1,833,053

UNITED STATES PATENT OFFICE

FRANK C. McMANUS, OF BROOKLYN, NEW YORK, ASSIGNOR TO INTERNATIONAL MOTOR COMPANY, OF NEW YORK, N. Y., A CORPORATION OF DELAWARE

SIX WHEEL CHASSIS WITH INDIVIDUAL WHEEL MOUNTING

Application filed May 18, 1929. Serial No. 364,204.

The present invention relates to the mounting of wheels upon a vehicle chassis and embodies, more specifically, an improved form of wheel mounting in which each wheel, or pair of wheels, where two wheels are mounted together on the same side of the chassis, is independently mounted on the chassis frame.

The conventional wheel mounting for the chassis of a vehicle includes an axle which extends transversely across the frame and carries wheels at either end thereof. This axle is mounted upon the frame in a well known manner and thus elevates the frame substantially from the floor level. The transverse axle decreases the clearance between the floor level and the chassis and, in addition, raises the center of gravity of the vehicle. In passing over irregularities in the road surface, the transverse axle materially complicates the stresses impressed upon the spring suspension and frame.

In accordance with the present invention, each wheel is mounted upon the frame individually of the others and thus the stresses incident to irregularities in the road surface are isolated and the riding qualities of the chassis materially improved. By mounting the wheels individually upon the chassis, the level of the chassis may be lowered, thus lowering the center of gravity of the vehicle without decreasing a given clearance between the under portion of the chassis and floor level. The present construction further embodies the provision of a common spring at each side of the chassis for engaging a plurality of wheels for supporting the chassis thereon, thus providing a flexible and effective spring mounting.

An object of the invention, therefore, is to provide a wheel mounting and spring suspension therefor which enables the center of gravity of the vehicle body to be lowered.

A further object of the invention is to provide a wheel mounting which isolates the stresses incident to the passing of the vehicle over irregularities in the road surface.

A further object of the invention is to provide a wheel mounting which enables the driving mechanism to be mounted in such manner that it is more adequately protected from stresses incident to the shocks and strains during driving than in existing forms of drives.

Further objects, not specifically enumerated above, will be apparent as the invention is described in greater detail in connection with the accompanying drawings, wherein:

Figure 1 is a plan view of a vehicle chassis constructed in accordance with the present invention.

Figure 2 is an enlarged view in section taken on line 2—2 of Figure 1, and looking in the direction of the arrows.

Figure 3 is an enlarged plan view showing the mounting for the side wheels of a six wheel vehicle.

Figure 4 is a view in elevation showing the wheel mountings of Figure 3.

Referring to the above drawings, $a$ designates the frame members of a vehicle chassis provided with an anchor tube $b$ extending transversely across the frame. Front and rear axle housings $c$ and $d$, respectively, are provided with live axles $c'$ and $d'$, respectively, for driving the sprockets $c^2$ and $d^2$. Upon the portion of the housings $c$ and $d$ which extend outwardly of the frame, brackets $e$ and $f$ are mounted, respectively. These brackets are journalled upon the aforesaid portions of the axle housings and carry housings $e'$ and $f'$, respectively. Wheels $g$ and $h$ are mounted in the respective housings $e'$ and $f'$ upon stub axles $g'$ and $h'$ which carry sprocket wheels $g^2$ and $h^2$, respectively. Driving chains $e^2$ and $f^2$, transmit the drive between the sprockets $c^2$ and $d^2$ and their respective sprockets $g^2$ and $h^2$.

Upon the anchor tube $b$, at either end thereof, a spring $i$ is mounted. This spring is carried by a bracket $i'$ which is journalled upon the anchor tube and the ends of the spring bear upon the top portions of the housings $e'$ and $f'$. In this manner, the chassis is sprung upon the wheels $g$ and $h$.

Bosses $e^3$ and $f^3$ are formed on the brackets $e$ and $f$ and receive cantilever springs $j$ and $k$, respectively. A tie rod $l$ connects the extremities of the springs $j$ and $k$ and thus serves to equalize the stresses carried by the respective wheels.

It will be seen that the sides of the housings $e'$ and $f'$ extend beyond the top, or peripheral walls thereof. The ends of the springs are received between these projecting side portions and serve as a means for preventing lateral movement of the wheels. The drive may be transmitted between the front and rear live axle sections in any well known manner and a detailed description of this portion of the chassis is unnecessary herein.

In the construction shown, the forward of the rear wheels are trailing wheels, while the rear wheels are leading. This enables the single spring to mount the chassis upon these wheels as described above and a highly flexible and serviceable spring mounting results. Stresses received by the wheels on either side are equalized between the respective side wheels by means of the spring as well as the equalizing tie rods $l$. Dispensing with the necessity of transverse axles which extend across the frame, enables the center of gravity of the vehicle to be lowered and the strength and serviceability thereof to be increased greatly.

The wheel mountings or housings $e'$ are formed with curved surfaces at the portions of their peripheries adjacent the wheels and the ends of the spring $i$ rest upon the upper portions of these surfaces. In this manner, as the load on the spring increases, the load arm decreases and the effective length of the spring decreases. While the invention has been described with reference to the specific constructions shown in the accompanying drawings, it is not to be limited, save as defined in the appended claims.

I claim as my invention:

1. A vehicle chassis including a frame, a plurality of individually mounted wheels at either side of the frame, means to mount one of the wheels to trail, means to mount another of the wheels adjacent the trailing wheel to lead, said wheels lying between the mounting means, means to transmit driving forces to the wheels through the respective mounting means, a common spring for supporting the frame on the wheels, an equalizer bar mounted for movement with respect to the wheel mountings, and means to connect the bar to the wheel mountings.

2. A vehicle chassis including a frame, a plurality of individually mounted wheels at either side of the frame, means to mount one of the wheels to trail, means to mount another of the wheels adjacent the trailing wheel to lead, a common spring for supporting the frame on the wheels, an equalizer bar, and leaf springs mounted on each wheel mounting and connected to the ends of the bar.

3. A vehicle chassis including a frame, a plurality of individually mounted wheels at either side of the frame, means to mount one of the wheels to trail, means to mount another of the wheels adjacent the trailing wheel to lead, a common spring for supporting the frame on the wheels, an equalizer bar, and leaf springs mounted on each wheel mounting on the opposite sides of the connections thereof to the frame from the wheels and connected to the ends of the bar.

This specification signed this 16th day of May, A. D. 1929.

FRANK C. McMANUS.